Figure 1:
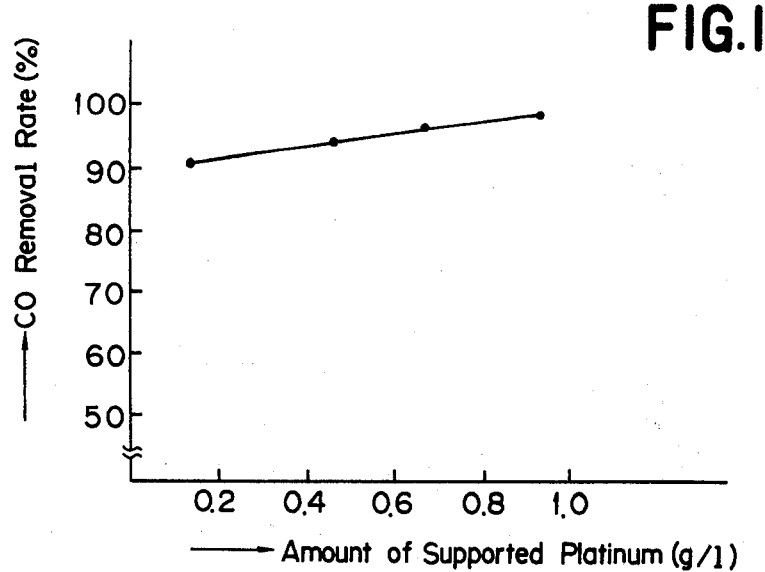

United States Patent [19]

Matsuzaka et al.

[11] 4,414,139

[45] Nov. 8, 1983

[54] CATALYST CARRIERS FOR PURIFICATION OF WASTE GAS AND PROCESS FOR PREPARING THE SAME

[75] Inventors: Takashi Matsuzaka, Fuji; Toshio Ohtsuki, Yokohama; Minoru Komori, Ayase; Tsutomu Sakuma, Yokohama, all of Japan

[73] Assignee: Tokyo Shibaura Denki Kabushiki Kaisha, Kawasaki, Japan

[21] Appl. No.: 428,269

[22] Filed: Sep. 29, 1982

[30] Foreign Application Priority Data

Nov. 19, 1981 [JP] Japan ................................. 56-184428

[51] Int. Cl.$^3$ ............................................. B01J 21/16
[52] U.S. Cl. .................................. 502/72; 423/213.5; 502/84
[58] Field of Search ........................... 252/455 R, 450; 423/213.5

[56] References Cited

FOREIGN PATENT DOCUMENTS 1542310  4/1973  Fed. Rep. of Germany .
55-162342 12/1980 Japan .

Primary Examiner—Delbert E. Gantz
Assistant Examiner—Anthony McFarlane
Attorney, Agent, or Firm—Schwartz, Jeffery, Schwaab, Mack, Blumenthal & Koch

[57] ABSTRACT

Disclosed are a catalyst carrier for purification of waste gas which comprises a carrier comprising a calcined clay material composed of 1 to 5% by weight of lithium oxide ($Li_2O$), not less than 20% by weight of aluminum oxide ($Al_2O_3$) and not less than 60% by weight of silicon dioxide ($SiO_2$), the total thereof being substantially 100; an aluminum oxide supported on the surface of the said clay material; and a platinum group element having further supported on said aluminum oxide; and a process for preparing the same.

7 Claims, 3 Drawing Figures

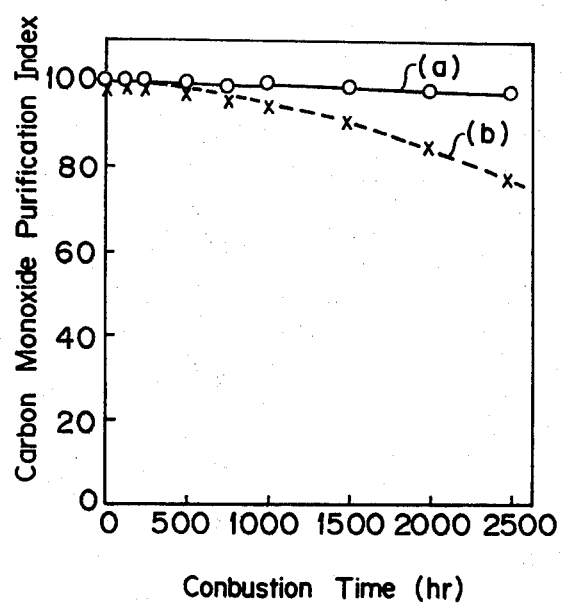

CATALYST CARRIERS FOR PURIFICATION OF WASTE GAS AND PROCESS FOR PREPARING THE SAME

This invention relates to a catalyst carrier for purification of waste gas and a process for preparing the same. More particularly, it is concerned with a catalyst carrier for purification of waste gas having a superior catalytic effect at a lower temperature, a prolonged life as a catalyst and a superior thermal shock resistance.

As space-closed type dwellings have recently been popularized and cooking manner changed, heating instruments, cooking instruments and the like have become diversified. On the other hand, there has been presented a problem wherein such harmful combustion waste gases as carbon monooxide, a hydrocarbon, nitrogen oxide, lampblack and the like, which are produced from these heating instruments, cooking instruments and the like, tend to contaminate dwelling environments.

Therefore, there have been studied various means for purification of such waste gases. For instance, one of such means is directed to the studies on a catalyst carrier capable of converting harmful substances in waste gas to harmless substance by decomposition.

As such catalyst carrier, there have been hitherto proposed, for example, those catalyst carriers comprising at least one of noble metals such as, for example, platinum, palladium and the like or metal oxides such as, for example, copper, chromium, iron, zinc or nickel oxides and the like, which is supported on a carrier such as, for example, a honeycomb-like, sphere-like or pellet-like porous material comprising, e.g. alumina, alumina-silica or cordierite or glass fiber.

In these catalyst carriers, however, it has been very difficult to make the catalyst homogeneously and effectively supported on the carrier and, as a result, a high catalytic effect could not have been accomplished with a small amount of the catalyst. Consequently, it has been previously attempted to make active alumina first supported on the carrier and then make a catalyst supported thereon (Japanese Patent Publication No. 3635/1977), but this method could not always provide a satisfactory catalytic effect and further presented a problem on its cost.

In particular, considering a catalytic effect, the prior art catalyst carrier when contacted with, for example, carbon monooxide show a removal rate for carbon monooxide of as low as not more than 40% at a temperature of not higher than 200° C. and then, if heating instruments or cooking instruments have just been on firing and are under still lower temperature as a whole, there is presented the problem that its catalytic effect would not be expectable. Moreover, it has been practically not satisfactory owing to its shortened catalyst life, and a removal rate for carbon monooxide is lowered even after application over, for instance, approximately 500 hours. In addition, the prior art catalyst carrier, especially its carrier has disadvantages that it tends to readily undergo damage on vibration, shock or the like owing to its low mechanical strength and also to readily produce crack or breakage in rapid heating or quenching.

It is a primary object of this invention to provide a catalyst carrier which can be readily prepared inexpensively, solve the above-mentioned disadvantages, show a non-reduced catalytic effect even in a small amount of the catalyst supported, still maintain a high catalytic effect at a lower temperature, have a superior thermal shock resistance and keep a prolonged life as a catalyst, as well as a process for preparing the same.

Other objects and advantages of this invention will be apparent from the following description.

The present inventors have been intensive studies and, as a result, have found out that the above objects can be accomplished by using as a carrier for a catalyst a calcined clay material and thereby providing a catalyst carrier comprising alumina and platinum group metal supported on the said carrier. This invention has been completed upon this finding.

More specifically, the catalyst for purification of waste gas according to this invention comprises a carrier which comprises a calcined clay material having a composition of 1 to 5% by weight of lithium oxide ($Li_2O$), not less than 20% by weight of aluminum oxide ($Al_2O_3$) and not less than 60% by weight of silicon dioxide, a total of these ingredients being substantially 100, an aluminum oxide supported on the surface of said calcined clay material, and a platinum group metal supported further on said aluminum oxide.

The clay material, which may be employed as a starting material for the present catalyst carrier, is meant to refer to those materials having incorporated therein a $LiO_2$-containing composition.

In general, a clay is a soil-like composite of natural ore containing as main ingredients aluminum oxide ($Al_2O_3$), silicon dioxide ($SiO_2$) as well as, for instance, iron oxide ($Fe_2O_3$), calcium oxide (CaO), magnesium oxide (MgO), sodium oxide ($Na_2O$), potassium oxide ($K_2O$) and the like. It may produce plasticity when its fine powder is moistened with water and then be molded into various types of forms. Such molded product may be converted to a calcined product having a porous structure and a prescribed mechanical strength where calcined at a suitable temperature.

Any clay containing at least 15% by weight of $Al_2O_3$ and at least 35% by weight of $SiO_2$ may be employed in this invention; there may be mentioned, for example, kaolin, china clay, acid clay, diaspore clay, Gairome (ga-iro-me) clay*, Kibushi (Ki-bu-shi) clay**, ball clay, mullite, bentonite, agalmatolite, alluvial soil, and the like. It is preferable to use a suitable blend of two or more of the clays selected from the above-recited members.

*A Japanese naming of a clay belonging to a kind of kaolin clay; a white or slightly grayish green clay containing in a scattering state a great amount of quarts particles having particle size of from 1 to 3 mm; available principally from the soil of Seto area of Aichi Prefecture, Tajimi area of Gifu Prefecture or Ueno area of Mie Prefecture, Japan; and having composition, for example, of 50.75% $SiO_2$, 32.55% $Al_2O_3$, 0.22% $TiO_2$, 1.69% $Fe_2O_3$, 0.14% MgO, 0.90% CaO, 0.83% $Na_2O+K_2O$, 2.19% $H_2O(+)$ and 10.71% $H_2O(-)$.
**A Japanese naming of a clay belonging to a kind of kaolinite-containing clay; available principally from the soil of Seto area of Aichi Prefecture, Tajimi area of Gifu Prefecture or Ueno area of Mie Prefecture, Japan; and having composition, for example, of 43.58% $SiO_2$, 33.94% $Al_2O_3$, 1.63% $Fe_2O_3$, 0.12% MgO, 0.10% CaO, 0.46% $Na_2O$, and 20.02% ignition loss.

As the $Li_2O$-containing composition which may be incorporated in the aforesaid clay, there may be employed any of those containing $Li_2O$, but usually and preferably spondumene ($Li_2O.Al_2O_3.4SiO_2$), petalite ($Li_2O.Al_2O_3.8SiO_2$) or lithium feldspar ($Li_2O.Al_2O_3.6SiO_2$).

In this invention, the clay material may be prepared as stated hereinbefore, by adding and blending the $Li_2O$-containing composition into the clay: In this instance, it is requisite that the ingredient ratio in the resultant clay material be controlled so as to be not less than 20% by weight of $Al_2O_3$, not less than 60% by weight of $SiO_2$ and 1 to 5% by weight of $Li_2O$, the total thereof being substantially 100.

In the case where the ingredient ratios of $Al_2O_3$ and $SiO_2$ in the clay material are not more than 20% by weight and not more than 60% by weight, respectively (in other words, where the amounts of $Fe_2O_3$, CaO, MgO, $Na_2O$, $K_2O$ and so on, inter alia, CaO, MgO, $Na_2O$, $K_2O$ incorporated are larger), support of the catalyst on the resultant carrier (the calcined product) is not smoothly accomplished, nor a catalytic effect at a low temperature improved.

Moreover, in the case where the ingredient ratio of $Li_2O$ in the clay material is not more than 1% by weight, improved thermal shock resistance of the resulting carrier (the calcined product) can not be obtained. If the ingredient ratio of $Li_2O$ is more than 5% by weight, thermal shock resistance of the resulting carrier (the calcined product) can be improved, but the carrier tends to become brittle, show reduced mechanical strength and then become worn and torn. Consequently, the upper limit of the ingredient ratio of $Li_2O$ in the clay material should be preferably 5% by weight.

As the $Al_2O_3$ source which may be supported on the above-mentioned carrier, there may be mentioned, for example, alumina sol, $\gamma$-alumina, other $Al_2O_3$-containing mixture and the like and one or more of those as stated above may be selected and employed.

As the platinum group element, there may be mentioned, for example, platinum, palladium, rhodium, ruthenium and the like and one or more of those as stated above may be selected and employed.

Then, the preparation of the said catalyst will be explained more fully hereinbelow.

The process for preparing a catalyst carrier for purification of waste gas according to the present invention comprises admixing at least two powdery clay materials containing as main ingredients $Al_2O_3$ and $SiO_2$ but having different compositions, so as to be 1 to 5% by weight of $Li_2O$, not less than 20% by weight of $Al_2O_3$ and not less than 60% by weight of $SiO_2$, the total thereof being substantially 100; subjecting the resultant mixture to calcination; coating $Al_2O_3$ over the surface of the resulting calcined product by dipping into a solution containing 55 to 90% by weight of alumina sol having a solid content of approximately 10% or a solution containing 30 to 50% by weight of an equal amount mixture of the said alumina sol and $\gamma$-alumina; subjecting the resulting product to heat treatment and then making a platinum group element supported thereon.

The present process may be conducted by first admixing at least two of the afore-said powdery clay materials to prepare a prescribed composition and, after, for example, kneading with addition of water, molding into a honeycomb-like, sphere-like or pellet-like shape by means of a molding device. Thereafter, the molded product thus formed is subjected to calcination under atmosphere.

Calcination condition is preferably set to a calcination temperature of 500° to 1400° C. over a calcination period of 1 to 2 hours, especially the calcination temperature of 1000° to 1400° C. so that the resulting calcined product may have a porous structure with an adequate mechanical strength (usually and preferably a bending strength of 50 to 300 kg/cm$^2$) and an adequate specific surface area (usually and preferably 50 to 200 m$^2$/g).

Then, a carrier comprising the resulting calcined product is carried with $Al_2O_3$. The procedures therefore may be effected first by dipping the calcined product into a solution containing 55 to 90% by weight of alumina sol having a solid content of approximatey 10% or a solution containing 30 to 50% by weight of a mixture of the said alumina sol with $\gamma$-alumina in an equal amount or by spray-coating or brushing the above solution onto the calcined product. The solution to be used in this instance is prepared, for example, by dissolving or dispersing the said alumina in water, a solvent containing 5% of hydrochloric acid and the like. The calcined product having $Al_2O_3$ impregnated and coated over the porous surface layer thereof is then subjected to heat treatment. Such heat treatment is accomplished by heating, for example, at 400° to 800° C. under atmosphere or hydrogen atmosphere over 1 to 2 hours. If the heating temperature is lower than 400° C., a sufficient adherence of alumina onto the calcined product after molding can not be attained, while if the temperature is higher than 800° C., alumina tends to agglomerate to provide a poorly dispersed state of alumina on the molded product surface and also a poor adherence of the platinum group element is obtained.

Further, the platinum group element is made supported on the so treated calcined product. The procedures therefor is effected by impregnating or adhering a solution of the platinum group element onto the surface and/or internal pores (herein, often referred to as a surface layer) of the so treated carrier by dipping method, spray-coating method or brushing method, and then heating, for example, at a temperature of 200° to 500° C. to thermally decompose the said element and make it supported on the carrier in the form of its metal or oxide. In this instance, it is preferably to employ a dipping method wherein the carrier is dipped into a solution of the platinum group element in order to make the platinum group element homogeneously supported on the carrier. The platinum group element is usually employed in the form of an approximately 0.2% aqueous solution of chloroplatinic acid ($H_3PtCl_6$) or a solution or dispersion thereof in water or other solvent.

The present catalyst carrier thus produced has the following advantages; namely, (1) a higher catalytic effect can be shown even with a less amount of the catalyst supported, since an influence of the component having an inhibitory action on a catalytic effect in the carrier is inhibited, (2) a less reduction in a catalytic effect is seen with a prolonged catalyst life, (3) a higher catalytic effect can be seen at a low temperature, (4) a superior thermal shock resistance is seen, (5) the carrier may be available inexpensively, since its raw material is readily available clay and there is no need to use a specific binder. The catalyst carrier for purification of waste gas thus obtained according to this invention is very useful for deodorization and purification of the combustion waste gas exhausted from heating instruments such as portable oilstoves, oil hot air-type heaters and the like, cooking instruments and so on.

Figure 2:
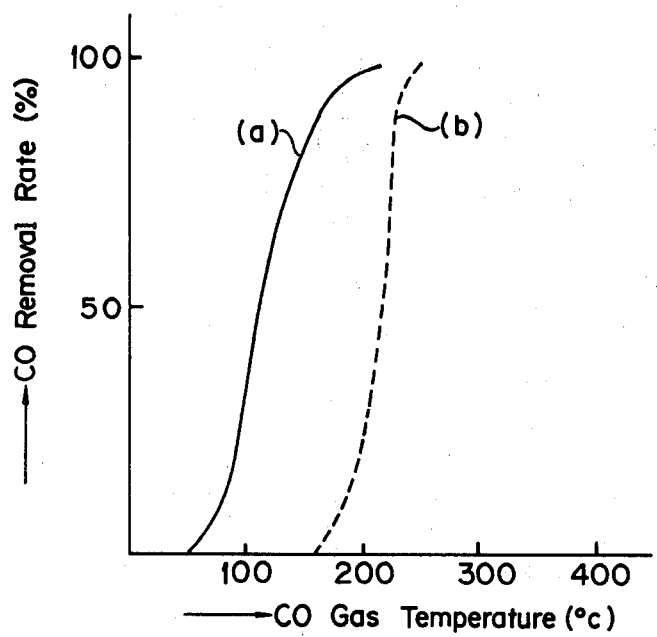

This invention will be more fully illustrated by the following examples, with further reference to the accompanying drawings, wherein: FIG. 1 is a diagram showing the relationship between a supported platinum amount (g/l) in the present catalyst carrier employing as its starting material the clay material containing 3.0% by weight of $Li_2O$, and a CO removal ratio (%); FIG. 2 is a diagram showing the relationship between a CO gas temperature and a CO removal ratio, with respect to the present catalyst carrier employing as its starting material the clay material containing 3.0% by weight of Li$_2$O and having a supported platinum amount of 0.9 g/l and a commercially available conventional catalyst carrier; and FIG. 3 is a diagram showing changes in carbon monooxide purification index with lapse of time where the present catalyst carrier and the prior art catalyst carrier are applied.

EXAMPLE 1

A mixed clay powder A was prepared by admixing Kibushi clay powder containing as main ingredients 35% by weight of Al$_2$O$_3$ and 48% by weight of SiO$_2$ with Gairome clay powder containing as main ingredients 34% by weight of Al$_2$O$_3$ and 50% by weight of SiO$_2$ at a weight ratio of 1:1.

Thereafter, a powdery mullite (3Al$_2$O$_3$.2SiO$_2$) containing as main ingredients 53% by weight of Al$_2$O$_3$ and 45% by weight of SiO$_2$ was admixed with a powdery petalite to form 3 types of mixed clay powder B containing 2, 6 and 10% by weight of the petalite (see page 5, lines 9–10), respectively.

The said mixed clay powder A was admixed with the said mixed petalite powder B at a weight ratio of 1:1 to form a starting material for clay material. Conventional chemical analysis established that all clay material powders contain not less than 20% by weight of Al$_2$O$_3$ and not less than 60% by weight of SiO$_2$, with the content of Li$_2$O being 1% by weight, 3% by weight and 5% by weight, respectively.

The clay material powder was kneaded with a proper volume of water for one hour and the resultant kneaded product was press-molded into a honeycomb-like disc with a diameter of 130 mm and a thickness of 5 mm. The disc was dried and cured under atmosphere and then calcined at 1200° C. over one hour to form a calcined product.

Each of the three calcined products thus obtained was dipped into a 55% by weight solution of alumina sol (manufactured by NISSAN CHEMICAL INDUSTRIES, LTD., having an Al$_2$O$_3$ solid content of 10% to prepare a carrier having Al$_2$O$_3$ coated over the surface layer thereof. The carrier was allowed to be dried and heated at 600° C. for one hour. Then, it was dipped into chloroplatinic acid solutions having concentrations of 0.20, 0.15, 0.10 and 0.05% for one minute to prepare four samples having different chloroplatinic acid contents, respectively. Thereafter, these samples were air-dried and heated at 600° C. for one hour to produce the catalyst carrier of this invention.

Conventional analysis on a supported platinum amount on the resulting catalyst carrier showed that a supported platinum amount (g) to apparent volume of the catalyst (l) is 0.90 g/l, 0.70 g/l, 0.45 g/l, and 0.25 g/l, respectively.

EXAMPLE 2

Following the substantially same procedures, as in Example 1 except that a solution containing 15% by weight each of the said alumina sol and γ-alumina was employed for supporting Al$_2$O$_3$ on calcined product, there was prepared a catalyst carrier. The supported platinum amount on the resulting catalyst carrier was equal to that of Example 1.

Experiment 1

Measurement of Carbon Monooxide Removal Rate

Four catalysts, which were prepared from the starting carrier material of a clay material containing 3.0% by weight of Li$_2$O according to Example 1 and had different supported platinum amounts, were measured for carbon monooxide removal rate.

Each of the four catalyst carriers was independently placed in a ventilated reaction equipment and a gas containing carbon monooxide of 250 ppm with an air balance so controlled that S.V. value (space velocity value) may be 10000 (1/hr) was fed therethrough at a flow quantity of 11.1 l/min. Carbon monooxide concentrations before and after the gas passes through the catalyst carrier were measured by means of a CO analytical instrument according to a N.D.I.R method and a CO removal ratio (%) was calculated.

Measurement temperature was 200° C.

The results are shown in FIG. 1 in terms of CO removal ratio to supported platinum amount (g/l). As apparent from FIG. 1, the catalyst carrier of this invention was found to show the less supported platinum amount of 0.3 to 1.0 g/l and the CO removal ratio of above 90% even at a relatively lower temperature of 200° C.

Then, the present catalyst with the supported platinum amount of 0.90 g/l prepared according to Example 1 was measured under the same condition as stated above for CO removal ratio (%) at inlet gas temperatures of 100° C., 150° C. and 200° C., respectively. For comparison, measurement was similarly effected on the prior art commercially available catalyst having 1 to 2 g/l of platinum supported on a carrier made of cordierite [composition: 2Mg.0.5SiO$_2$.2Al$_2$O$_3$].

These results are summarized in the following Table 1 and also illustrated in FIG. 2 wherein the curve (a) is for the present catalyst carrier and the curve (b) is for the said prior art catalyst carrier. As apparent from Table 1 and FIG. 2, the present catalyst carrier was found to have a superior catalytic effect even at a lower temperature as compared with the prior art commercially available catalyst carrier.

Similar results were obtained with the catalyst carrier prepared according to Example 2.

TABLE 1

| Catalyst | CO gas temp. (°C.) | | |
|---|---|---|---|
| | 100 | 150 | 200 |
| Present catalyst (Pt: 0.9 g/l) | 38 | 77 | 97 |
| Prior art catalyst (Pt: 1 to 2 g/l) | 0 | 0 | 40 |

Experiment 2

Catalyst Life

A catalyst carrier having a platinum amount of 0.92 g/l supported on a carrier containing 3% by weight of Li$_2$O according to Example 1 was assembled into a portable oilstove and removal index of carbon monoxide with lapse of time was investigated.

Measurement was effected by using a catalyst with an outer diameter of 130 φ and a thickness of 5 mm and setting a wick height of the oilstove under the best combustion condition, and purification degree of carbon monooxide was determined in terms of index under the condition that the maximum temperature was about 570° C. when the catalyst actually charged. The results are shown in FIG. 3.

At the same time, similar measurement was done with the prior art commercial catalyst carrier comprising the cordierite carrier having 1 to 2 g/l of platinum supported thereon, in a similar manner to Experiment 1, for comparison.

As apparent from FIG. 3, the catalyst carrier of this invention [as shown with the curve (a)] was found to exert a more stable catalytic effect over a prolonged period of time, as compared with the prior art catalyst carrier [as shown with the curve (b)].

Also, the catalyst carrier prepared according to Example 2 was similarly found to show a prolonged catalyst life.

Experiment 3

Thermal Shock Resistance Test

Respective fifty carriers were prepared from each of clay materials containing $Li_2O$ at 1% by weight, 3% by weight and 5% by weight, respectively, and respective fifty catalyst carrier, each having a supported platinum amount of 0.9 g/l, were prepared from the said carriers according to Example 1.

These catalyst carriers were placed in a portable oilstove with a caloric value of 2140 K cal/hr at the position of about 7.5 cm above its radiator net, heated under stationary combustion state for 30 minutes to one hour and immediately thereafter thrown into water (25° C.). Immediately before thrown into water, central temperature of the catalyst carrier was 530° to 570° C. and peripheral temperature thereof 450° to 500° C.

When the catalyst carrier was quenched in water, the number of broken catalysts as well as the number of catalysts having fissures such as cracks and the like were calculated out, respectively.

Also, similar test was effected with the commercially available catalyst as used in Experiment 1, for comparison.

These results are summarized in the following Table 2, wherein also shown are average values for vending strength, specific surface area and linear expansion coefficient measured in respect of each catalyst carrier.

TABLE 2

| | Sort of catalyst carrier | | | |
|---|---|---|---|---|
| | $Li_2O$ content in catalyst carrier of the invention (wt. %) | | | Prior art catalyst |
| Test item | 1 | 3 | 5 | carrier |
| Number of broken ones | 20 | 0 | 0 | 40 |
| Number of fissured ones | 30 | 0 | 0 | 50 |
| Vending strength (kg/cm²) | 180~230 | 150~200 | 70~130 | 70~110 |
| Specific surface area (m²/g) | 10~90 | 50~150 | 20~100 | 40~110 |
| Linear Expansion coefficient (× 10⁻⁶/°C., | 2.0~4.0 | 0.76~0.96 | −0.10~0.20 | 2.5~4.2 |

TABLE 2-continued

| | Sort of catalyst carrier | | | |
|---|---|---|---|---|
| | $Li_2O$ content in catalyst carrier of the invention (wt. %) | | | Prior art catalyst |
| Test item | 1 | 3 | 5 | carrier |
| 20~800° C.) | | | | |

As apparent from Table 2, the catalyst carrier of this invention was found to have a remarkably superior thermal shock resistance, as compared with the prior art catalyst carrier. It was also found that the larger the component ratio of $Li_2O$ becomes, the lower mechanical strength of the catalyst carrier is.

Substantially same results were obtained with the catalyst carrier prepared according to Example 2.

I claim:

1. A catalyst carrier for purification of waste gas which comprises a carrier comprising a calcined clay material composed of 1 to 5% by weight of lithium oxide ($Li_2O$), not less than 20% by weight of aluminum oxide ($Al_2O_3$) and not less than 60% by weight of silicon dioxide ($SiO_2$), the total thereof being substantially 100; an aluminum oxide supported on the surface of the said clay material; and a platinum group element having further supported on said aluminum oxide.

2. The catalyst carrier according to claim 1, wherein said clay material is a mixture of a $Li_2O$-containing composition selected from the group consisting of spondumene, petalite and lithium feldspar with at least two members selected from the group consisting of kaolin, china clay, acid clay, diaspore clay, Gairome clay, Kibushi clay, ball clay, bentonite, agalmatolite and alluvial soil.

3. The catalyst carrier according to claim 1, wherein said platinum group element is selected from platinum (Pt), palladium (Pd), rhodium (Rh), and ruthenium (Ru).

4. The catalyst carrier according to claim 3, wherein said platinum group element is platinum.

5. A process for preparing a catalyst carrier for purification of waste gas which comprises admixing at least two of clay materials containing as main ingredients an aluminum oxide and silicon dioxide with a lithium oxide-containing composition to prepare a mixture containing 1 to 5% by weight of a lithium oxide, not less than 20% by weight of an aluminum oxide and not less than 60% by weight of silicon dioxide; molding and calcining said mixture; dipping the calcined product into a solution containing 55 to 90% by weight of alumina sol with a solid content of about 10% to coal $Al_2O_3$ over the surface layer thereof; heating the coated product; and then making a platinum group element supported on the heat-treated product.

6. The process according to claim 5, wherein said calcined product is dipped into a 30 to 50% by weight solution of said alumina sol and γ-alumina in equal amount.

7. The process according to claim 5 or 6, wherein calcination is effected by heating said clay powder mixture at a temperature of 500° to 1400° C. for 1 to 2 hours under atmosphere.

* * * * *